United States Patent
Pemen et al.

(10) Patent No.: US 10,669,169 B2
(45) Date of Patent: Jun. 2, 2020

(54) PLASMA ACTIVATED WATER

(71) Applicant: VitalFluid B.V., Nijmegen (NL)

(72) Inventors: August Johannes Marie Pemen, Breda (NL); Wilhelmus Frederik Laurens Maria Hoeben, Eindhoven (NL); Pieter Polo van Ooij, Eindhoven (NL); Paulus Hendrikus Maria Leenders, Nijmegen (NL)

(73) Assignee: VitalFluid B.V., Nijmegen (NL)

( * ) Notice: Subject to any disclaimer, the term of this patent is extended or adjusted under 35 U.S.C. 154(b) by 235 days.

(21) Appl. No.: 15/536,226

(22) PCT Filed: Dec. 14, 2015

(86) PCT No.: PCT/EP2015/079634
§ 371 (c)(1),
(2) Date: Jun. 15, 2017

(87) PCT Pub. No.: WO2016/096751
PCT Pub. Date: Jun. 23, 2016

(65) Prior Publication Data
US 2018/0327283 A1   Nov. 15, 2018

Related U.S. Application Data

(60) Provisional application No. 62/091,839, filed on Dec. 15, 2014.

(51) Int. Cl.
*C02F 1/46* (2006.01)
*H05H 1/24* (2006.01)
(Continued)

(52) U.S. Cl.
CPC .......... *C02F 1/4608* (2013.01); *B01J 19/088* (2013.01); *C01B 15/027* (2013.01);
(Continued)

(58) Field of Classification Search
None
See application file for complete search history.

(56) References Cited

U.S. PATENT DOCUMENTS

| | | | |
|---|---|---|---|
| 5,855,856 A * | 1/1999 | Karlson | A61L 2/202 204/176 |
| 2009/0236215 A1* | 9/2009 | Burlica | B01J 19/088 204/164 |

(Continued)

FOREIGN PATENT DOCUMENTS

KR    20120111544    7/2013

OTHER PUBLICATIONS

Zhang et al. Remove of phenolic compounds in water by low-temperature plasma: a review of current research. J. Water Resource and Protection 2009;2:99-109.
(Continued)

*Primary Examiner* — Kishor Mayekar
(74) *Attorney, Agent, or Firm* — N.V. Nederlandsch Octrooibureau; Catherine A. Schultz; Katelyn J. Bernier (57) ABSTRACT

A thermal and non-thermal plasma activated water reactor system is provided that includes a reaction chamber, where the reaction chamber includes a gas inlet, a water inlet, a gas and water outlet, a ground electrode and reaction electrodes, where the water inlet and the water outlet are disposed to form a water vortex in the reaction chamber when water flows there through, where the reaction electrodes include a thermal plasma electrode and a non-thermal plasma electrode, and a plasma activated water reservoir that is disposed to receive the plasma activated water from the reaction chamber and disposed to return the plasma activated water to the reaction chamber.

17 Claims, 11 Drawing Sheets

(51) Int. Cl.
  *C02F 1/72* (2006.01)
  *B01J 19/08* (2006.01)
  *C05C 11/00* (2006.01)
  *C01B 15/027* (2006.01)
  *C02F 1/461* (2006.01)
  *C02F 1/74* (2006.01)

(52) U.S. Cl.
  CPC ............ *C02F 1/4618* (2013.01); *C02F 1/722* (2013.01); *C02F 1/74* (2013.01); *C05C 11/00* (2013.01); *H05H 1/2406* (2013.01); *B01J 2219/0809* (2013.01); *B01J 2219/0877* (2013.01); *B01J 2219/0896* (2013.01); *B01J 2219/0898* (2013.01); *C02F 2201/4611* (2013.01); *C02F 2201/46155* (2013.01); *C02F 2201/46175* (2013.01); *C02F 2301/026* (2013.01); *C02F 2303/04* (2013.01); *H05H 2001/2412* (2013.01)

(56) References Cited

U.S. PATENT DOCUMENTS

| | | | | |
|---|---|---|---|---|
| 2011/0226705 | A1* | 9/2011 | Dholakia | C02F 1/78 210/750 |
| 2012/0129057 | A1* | 5/2012 | Mitsui | G01F 23/263 429/402 |
| 2014/0051620 | A1* | 2/2014 | Soane | C09K 8/36 508/471 |
| 2014/0262789 | A1* | 9/2014 | Shannon | C02F 1/46 204/554 |
| 2014/0326681 | A1 | 11/2014 | Denvir | |
| 2016/0102025 | A1* | 4/2016 | Nunnally | C05C 5/00 424/616 |

OTHER PUBLICATIONS

Lindsay et al. Fertilization of radishes, tomatoes, and marigolds using a large-volume atmospheric glow discharge. Plasma Chem. Plasma Process 2014:34:1271-1290.

Lukes et al. Generation of ozone by pulse corona discharge over water surface in hybrid gas-liquid electrical discharge reactor. Appl. Phys. 38 (2005) 409-416.

* cited by examiner

A: insulator
B: Non-thermal electrode
C: Thermal electrode

PLASMA ACTIVATED WATER

CROSS-REFERENCE TO RELATED APPLICATIONS

This application is a 371 of PCT/EP2015/079634 filed on Dec. 14, 2015. PCT/EP2015/079634 filed on Dec. 14, 201 claims the benefit of U.S. Provisional application 62/091,839 filed on Dec. 15, 2014.

FIELD OF THE INVENTION

The present invention relates generally to plasma activated water. More particularly, the invention relates to a method and system of thermal and non-thermal plasma for generating plasma activated water.

BACKGROUND OF THE INVENTION

Water can be "activated" by applying plasma in contact with the water, for instance by creating plasma inside (bubbles in) the water, or along a water surface. Plasma activated water (PAW) typically contains hydrogen peroxide, nitrates, nitrites, where peroxynitrite is formed due to a reaction with nitrite and hydrogen peroxide in an acidic environment, and is only present in PAW for period of approximately 15 minutes after activation. Further, PAW typically has a pH ranging from 0 to 7. The components of PAW and the low pH have proven synergistic antimicrobial effects against bacteria, biofilms, yeasts and other microorganisms. PAW can be used as a natural fertilizer, it enhances seed germination and stimulates plant growth.

Current PAW production methods employ either non-thermal (or cold) plasma or thermal plasma. Combining both has several advantages, but until now has never been realized. A non-thermal plasma essentially produces reactive oxygen and reactive nitrogen species (ROS, RNS) in the gas phase, which result in the formation of the products in the water.

Figure 1:
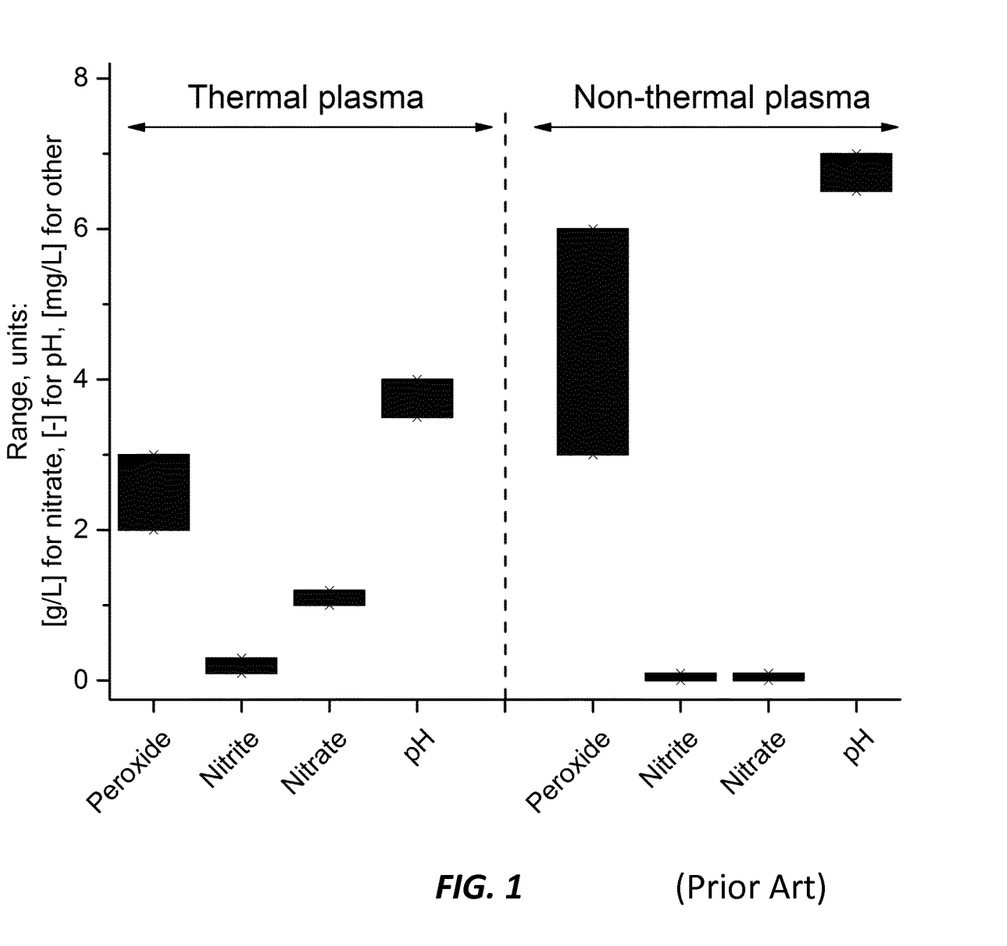
FIG. 1 shows a prior art graph of typical pH and concentrations for peroxide, nitrite and nitrate for both a thermal and a non-thermal plasma.

In particular the production of ROS (i.e. hydrogen peroxide) is effective with non-thermal plasma. FIG. 1 shows a prior art graph of typical pH and concentrations for peroxide, nitrite and nitrate for both a thermal and a non-thermal plasma.

For the creation of RNS in the water, a thermal plasma is more efficient due to the relatively high temperature of such plasma, which yields higher concentrations with low creation of peroxide, where high temperatures decompose peroxide and peroxynitrite is an isomer of nitrate and very unstable, this component will always decompose quickly.

The production of nitrate as a result of the activation process has shown to be very energy efficient and can be used as an energy efficient alternative for the production of nitrogen components in fertilizers, currently produced by the high energy consuming Haber-Bosch process. The activation process has also shown to be efficient for the production of peroxide.

The wide range of potential applications requires a good control over the composition of the PAW. This is difficult with current methods, where higher product yields and higher production rates are required.

What is needed is a PAW production system and method that includes employing both thermal and non-thermal plasma, where the two plasma modes can be generated individually or simultaneously.

SUMMARY OF THE INVENTION

To address the needs in the art, a thermal and non-thermal plasma activated water reactor system is provided that includes a reaction chamber, where the reaction chamber includes a gas inlet, a water inlet, a gas and water outlet, a ground electrode and reaction electrodes, where the water inlet and the water outlet are disposed to form a water vortex in the reaction chamber when water flows there through, where the reaction electrodes include a thermal plasma electrode and a non-thermal plasma electrode, and a plasma activated water reservoir that is disposed to receive the plasma activated water from the reaction chamber and disposed to return the plasma activated water to the reaction chamber.

According to one aspect of the invention, the water reservoir includes a water conduit connecting the water reservoir to the reaction chamber water inlet, where the water conduit includes a water pump disposed to move water from the water reservoir to the reaction chamber.

In a further aspect of the invention, the water reservoir includes a gas conduit connecting a headspace of the water reservoir to the reaction chamber gas inlet, where the gas conduit includes a gas pump disposed to move gas from the water reservoir to the reaction chamber. In one aspect, the gas conduit further includes a fresh air port, where the fresh air port is disposed to input fresh air to the gas conduit, where the fresh air is input to the reaction chamber gas inlet.

According to another aspect of the invention, the reaction chamber includes a plasma activated water conduit connecting the reaction chamber to the water reservoir, where the plasma activated water conduit includes a cooling element disposed to cool the plasma activated water moving from the reaction chamber to the water reservoir. In one aspect, the plasma activated water conduit includes a plasma activated water pump disposed to move the plasma activated water from the reaction chamber to the water reservoir. In the further aspect, the water conduit can include a static mixer, a venture mixer, or a cyclone mixer. In a further aspect, the cooling element is replaced by a static mixer.

According to one aspect of the invention, the non-thermal electrode and the thermal electrode are turned on and turned off independently, in opposition or in tandem.

In yet another aspect of the invention, the thermal plasma electrode is connected to a pulsed AC voltage, a positive DC voltage or a negative DC voltage.

According to a further aspect of the invention, the non-thermal electrode is connected to a pulsed RF voltage, an AC-RF voltage, or a DC voltage, where the DC voltage includes an ohmic series impedance element.

In another aspect of the invention, the reaction chamber includes a thermal portion separated from a non-thermal portion, where the thermal portion is connected to the non-thermal portion by a reaction chamber conduit, where the thermal portion includes the thermal electrode, where the non-thermal portion includes the non-thermal electrode. In one aspect, the non-thermal electrode is coupled to the gas inlet, where the gas inlet is coupled to the water inlet of the reaction chamber, where water in the water inlet is plasma activated by the non-thermal electrode as gas is drawn into the water inlet according to venturi forces of said water inlet.

According to another aspect of the invention, the thermal and non-thermal electrodes produce reactive oxygen species and reactive nitrogen in the plasma activated water.

In a further aspect of the invention, the thermal and non-thermal plasma activated water reactor system is configured to produce a fertilizer nitrogen species or a hydrogen peroxide species.

In another aspect of the invention, the non-thermal plasma electrode includes a plurality of non-thermal electrodes, where energy is evenly divided over all the plurality of non-thermal electrodes.

According to a further aspect of the invention, the ground electrode includes a metallic container and the reaction chamber includes a glass or a dielectric chamber, where plasma current is conducted by a wall of the glass or the dielectric reaction chamber, where the plasma current includes a displacement current, or a capacitive current. In one aspect, the metallic container is a metallic foil.

BRIEF DESCRIPTION OF THE DRAWINGS

FIGS. 3A-3G show a closed loop reactor system for the production of PAW that includes (3A) recirculating system with both air and water pump and fresh air inlet; (3B) recirculation system with one pump in the water/gas outlet and a fresh air inlet, (3C) and (3D) are the same as (3A) and (3B) but without fresh air inlet, and (3E) is the same as (3B) with a water pump, where the reactors have multiple electrodes creating thermal plasma, combined with multiple electrodes creating non-thermal plasma, (3F) is the same as (3C) with thermal electrodes only in the reactor, and without the air pump, where the non-thermal electrode is coupled with a venturi port entering the return water port to the main reactor chamber, (3G) is the same as (3C), with the cooling element replaced with a static mixer, according to one embodiment of the invention.

DETAILED DESCRIPTION

The current invention provides a PAW production system and method that includes employing both thermal and non-thermal plasma, where the two plasma modes can be generated individually or simultaneously. According to one embodiment of the invention, the energy of both plasma modes and the on/off times of both plasma modes (thus the plasma power) can be controlled independently, which allows good control over the concentrations of both reactive oxygen species (ROS) and reactive nitrogen species (RNS) products, and of the pH, ORP and EC values of the PAW. Controlling these variables allows for optimization of production yields of the various PAW components. This allows for full control over the composition of the PAW and tuning of the PAW.

The current invention ensures optimal utilization of the reactive species produced by the plasma. Efficient mixing of the water and the reactive gas produced by the plasma is provided, so that reactive species are very well utilized and dissolved in the water. In one embodiment of the invention, a combined gas/water outlet and controlled gas phase recycling, such as closed circulation of the gas, ensures re-use of the plasma gas so that reactive species are not wasted after passing the gas through the reactor. In another embodiment, buffering the amount of water to be activated that includes a water reservoir is provided, where the PAW production system can be scaled towards the amount of water to be treated. The invention provides a method to activate water or a liquid in one single pass. This follow-through aspect provides a method to activate water in one single pass so that the PAW can be directly applied after activation at the point of use, allowing for the possibility to utilize the short term strong disinfecting and oxidizing properties of PAW.

Figure 2A:
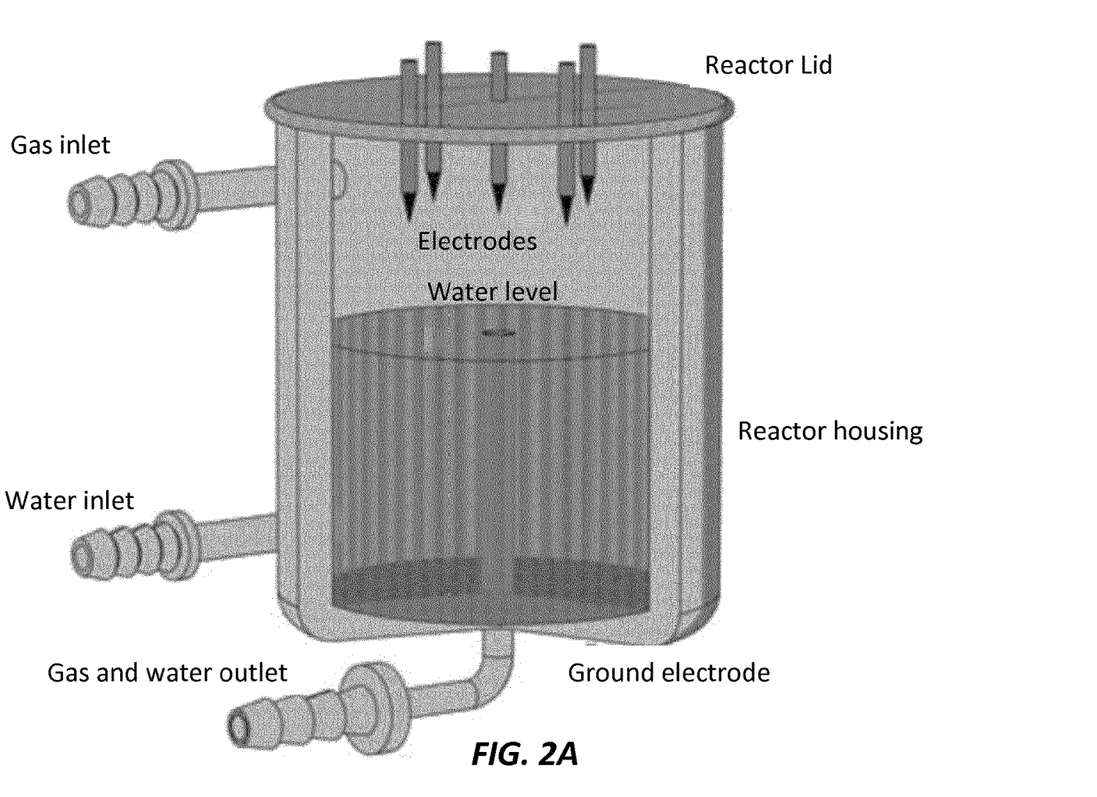
FIG. 2A shows a PAW-Reactor with: Electrode(s), Reactor lid, Gas inlet, Water inlet, Gas and water outlet, ground electrode, reactor housing, Water level, according to one embodiment of the invention.
Figure 2B:
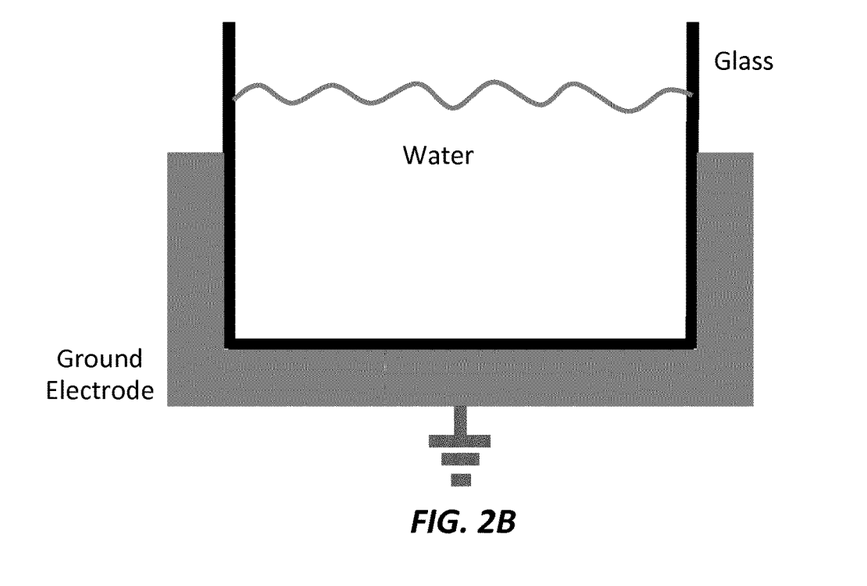
FIG. 2B shows a PAW-Reactor with a ground electrode being a metallic container that supports the glass reactor housing, according to one embodiment of the invention, according to one embodiment of the invention.

One exemplary embodiment of the reactor is shown in FIG. 2A that includes a closed system with a single or with multiple electrodes, a ground electrode, a water inlet, a gas inlet, a combined water and gas outlet, and a reactor housing. The ground electrode can include a metallic pin electrode inside the water. In one embodiment, shown in FIG. 2B, the ground electrode is a metallic container that also supports the glass reactor housing. The plasma current is conducted by the glass wall, for example a dielectric wall, as a displacement current, or capacitive current. In one embodiment, the metallic container can also be a metallic foil. Returning to FIG. 2A, water is flushed through the reactor with water level. Air is flushed through the reactor in the volume above the water level.

Within the reactor, two plasma modes can be generated in the gas volume above the water layer. Both modes can be generated and controlled individually or simultaneously. In this exemplary embodiment, the thermal plasma is generated using a pin electrode positioned at predefined distance above the water (FIG. 2A). The electrode can be connected to pulsed AC, positive DC, or negative DC high-voltage. Further, the non-thermal electrode can be connected to a pulsed RF voltage, an AC-RF voltage, or a DC voltage, where the DC voltage includes an ohmic series impedance element. The voltage must be sufficiently high in order to ignite the thermal plasma, which is either a pulsed, AC or continuous arc. To control the current through the plasma, the applied voltage can be lowered once the plasma is ignited (but not below the extinction voltage), and/or a series capacitor can be used. The current through the plasma affects the temperature of the arc, and consequently the rate of formation of the ROS and RNS. Eventual erosion of the electrodes can be reduced by reducing the plasma current, applying dedicated electrode material, by applying negative DC high voltage or by applying pulsed voltages.

For non-thermal plasma generation, a second electrode or a second set of electrodes is applied, where the electrode can be a pin electrode, or the set of electrodes can be an array of pin electrodes, a (surface) dielectric barrier type electrode, or corona wire electrodes. These electrodes are connected to pulsed or AC-RF high voltage, that is sufficiently high to generate the non-thermal plasma. Also a DC high-voltage can be applied, where a high-ohmic series impedance is needed in order to maintain and stabilize the non-thermal plasma.

In one embodiment of the invention, the same electrodes are used to generate both the thermal and the non-thermal plasma by switching the power supply between a thermal and a non-thermal mode with pre-defined duty cycles.

Figure 3A:
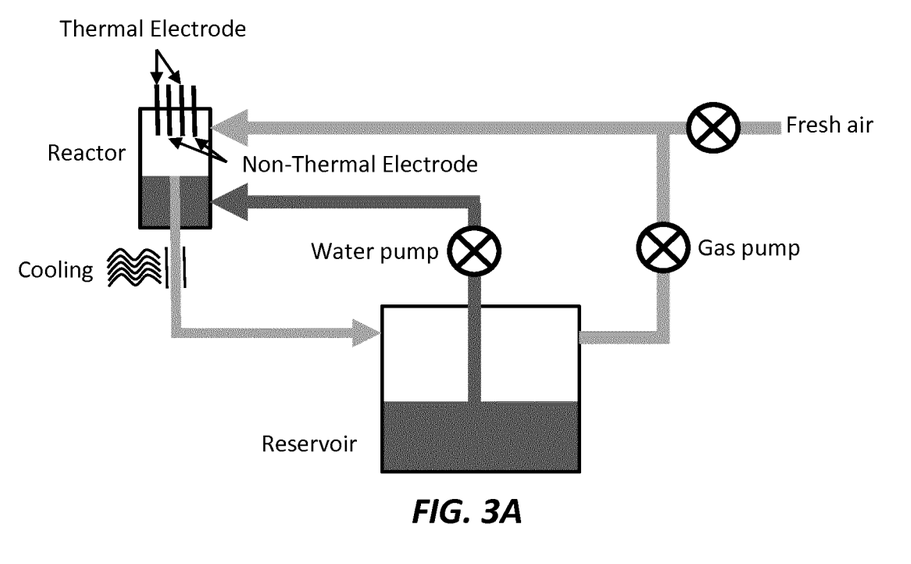
Figure 3B:
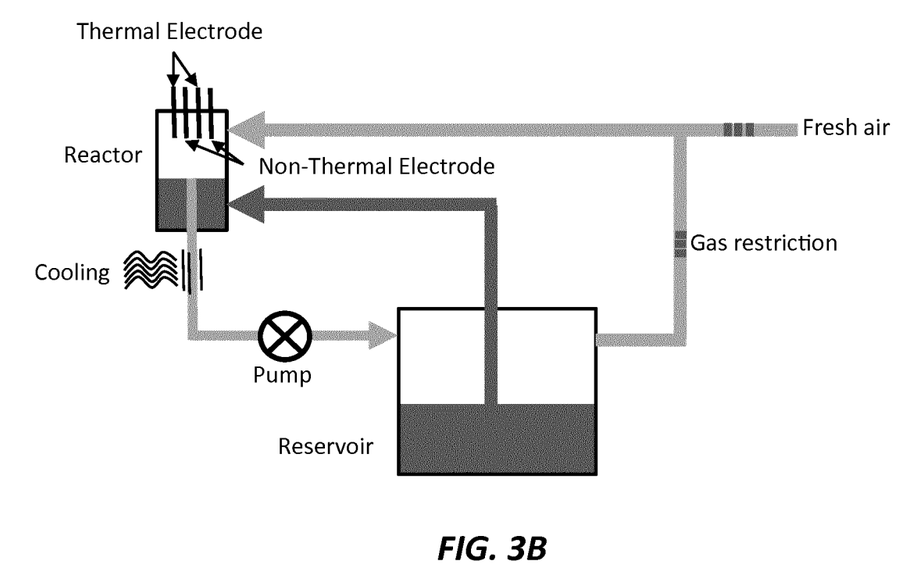
Figure 3C:
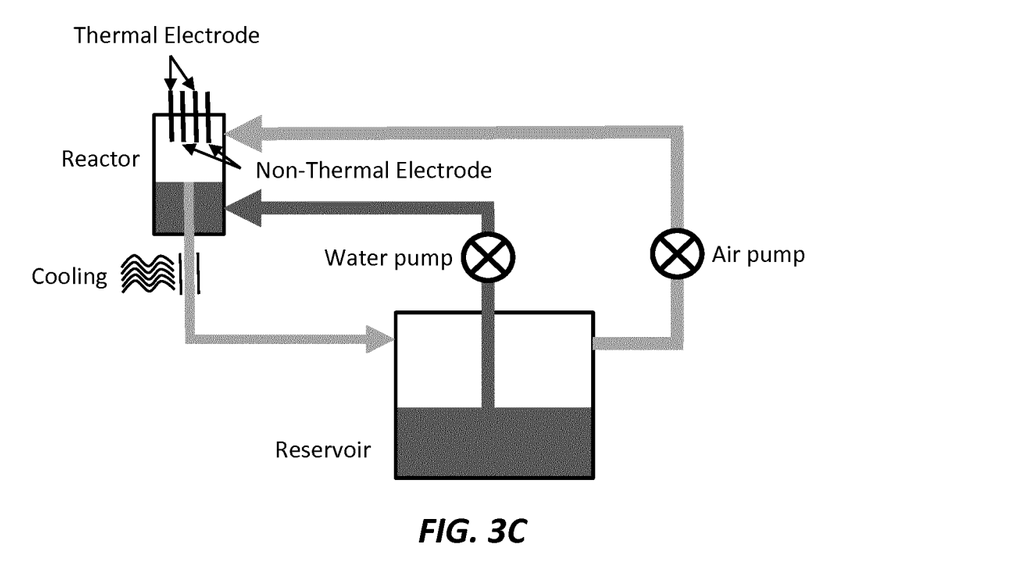
Figure 3D:
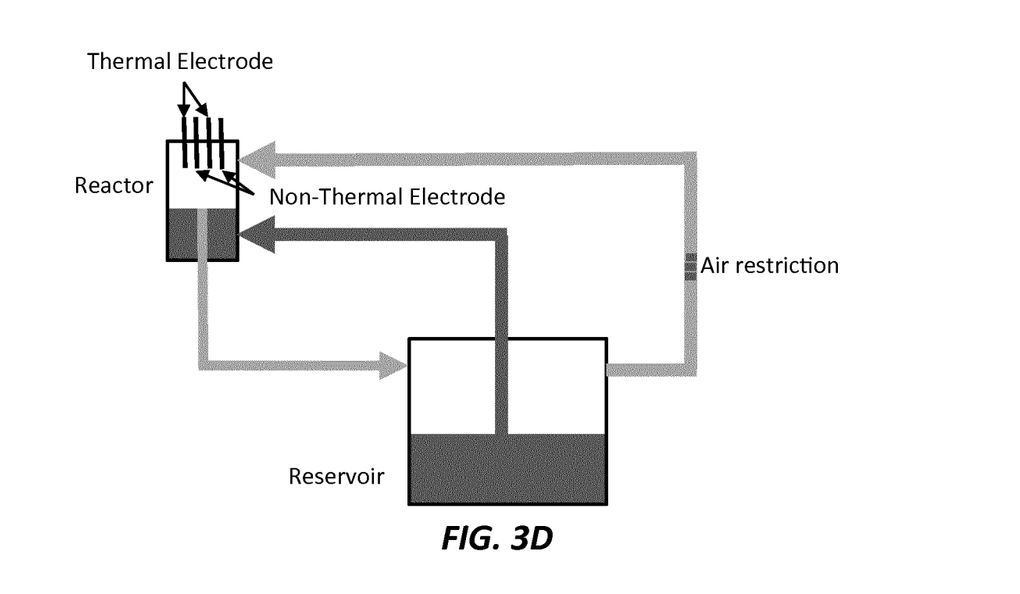
Figure 3E:
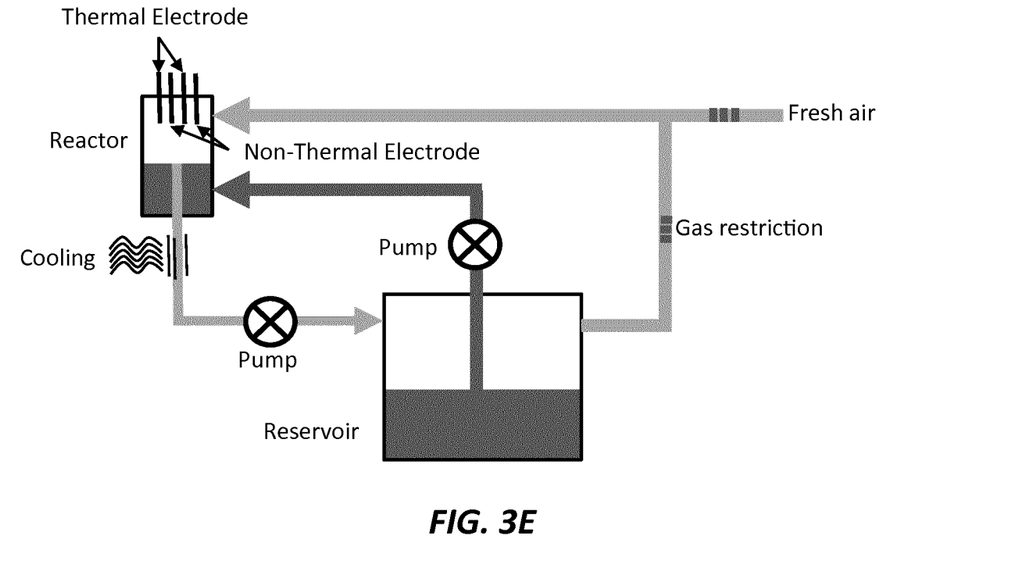
Figure 3F:
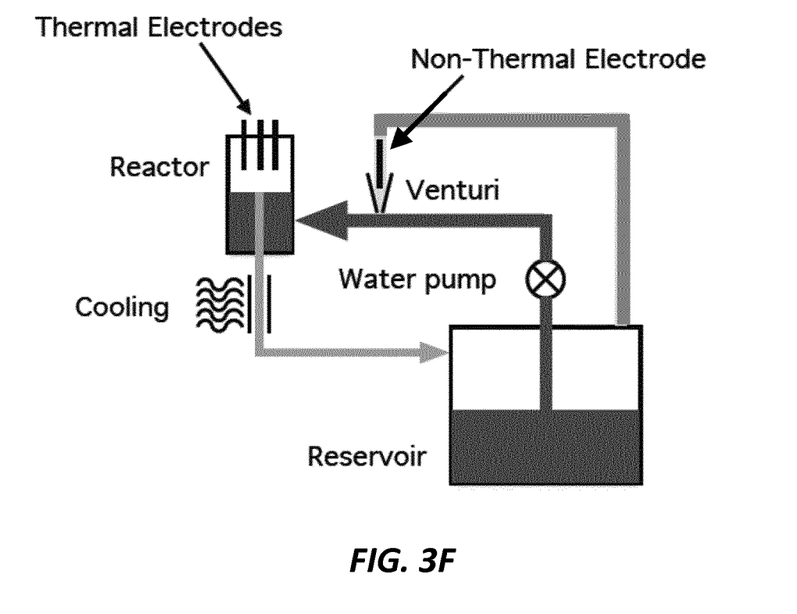
Figure 3G:
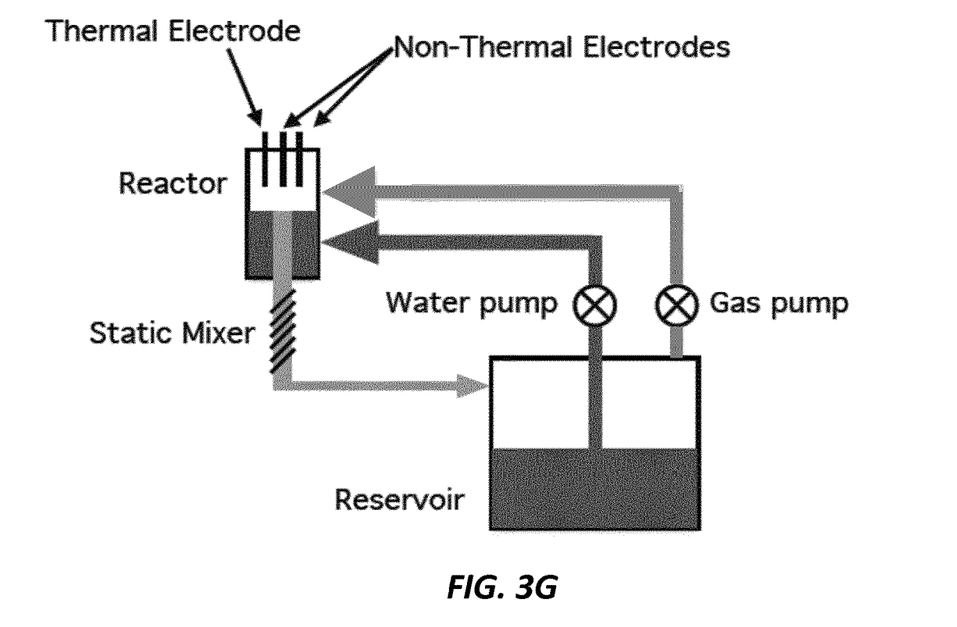

In another embodiment, the reactor is part of a closed loop system as shown in FIGS. 3A-3G, which includes a water reservoir. Within the loop system, both the water and air are circulated through the reactor to control the plasma activation. The circulation can be enabled by a separate air and water pump as shown in FIG. 3A and FIG. 3C, or by a single pump in the gas and water outlet as shown FIG. 3B and FIG. 3D and FIG. 3E is the same as FIG. 3B with a water pump, where the reactors have multiple electrodes creating thermal plasma, combined with multiple electrodes creating non-thermal plasma. In the latter case, the pressure in the reactor loop will be slightly reduced. During the plasma activation, air will be consumed since ROS and RNS, both produced from the air, will be partly dissolved into the water, and the formation of ROS and RNS consumes air. The configurations shown in FIG. 3A and FIG. 3B allow controlled gas phase recycling with periodic or continuous fresh air dosage. For the configurations as in FIG. 3C and FIG. 3D the water/air ratio must be adjusted so that enough air will be present to realize the specified PAW properties. FIG. 3F shows a configuration similar to FIG. 3C, with thermal electrodes only in the reactor, and without the air pump, where the non-thermal electrode is coupled with a venturi port entering the return water port to the main reactor chamber. FIG. 3G shows a configuration similar to FIG. 3C, with the cooling element replaced or combined with a static mixer.

Figure 4:
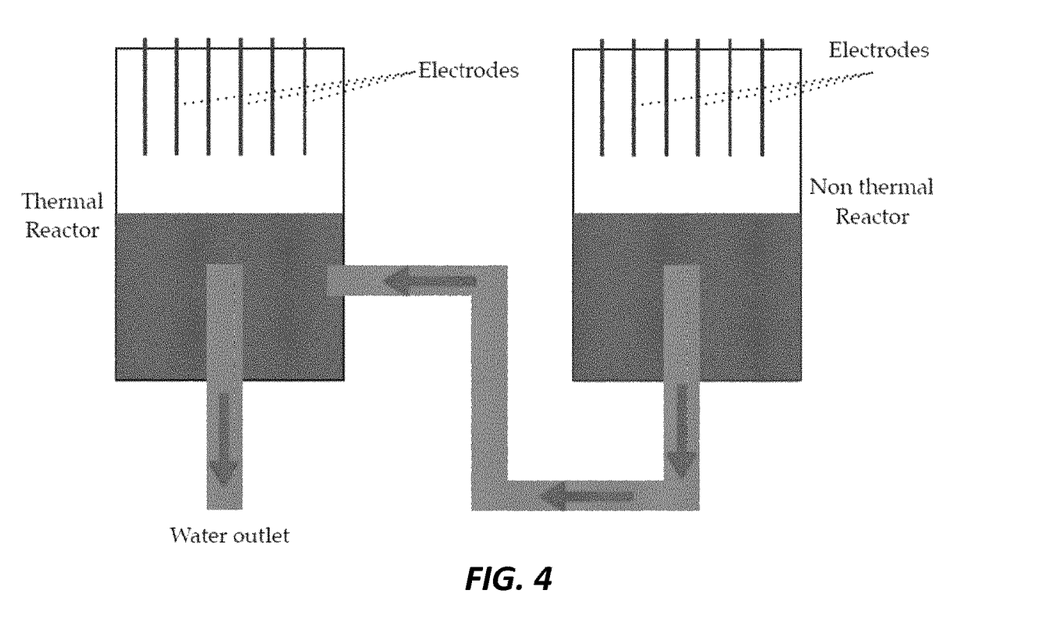
FIG. 4 shows the reaction chamber having a thermal portion separated from a non-thermal portion, where the thermal portion is connected to the non-thermal portion by a reaction chamber conduit, where the thermal portion includes the thermal electrode, where the non-thermal portion includes the non-thermal electrode, according to one embodiment of the invention.
Figure 5:
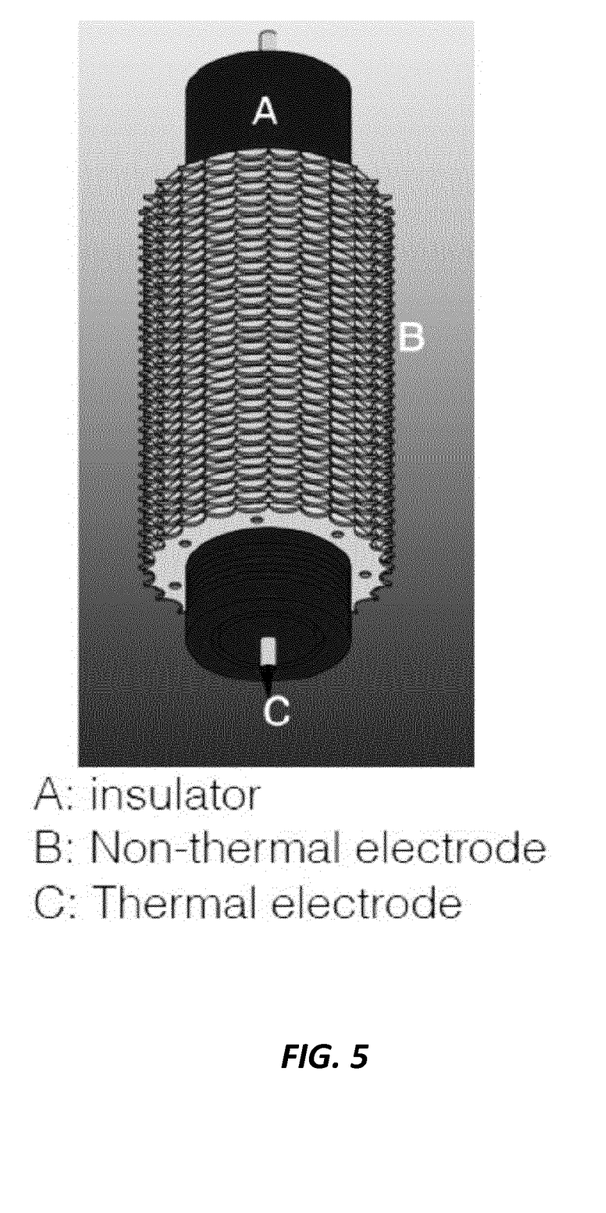
FIG. 5 shows an electrode having an insulator, a non-thermal electrode and a thermal electrode, according to one embodiment of the invention.
Figure 6A:
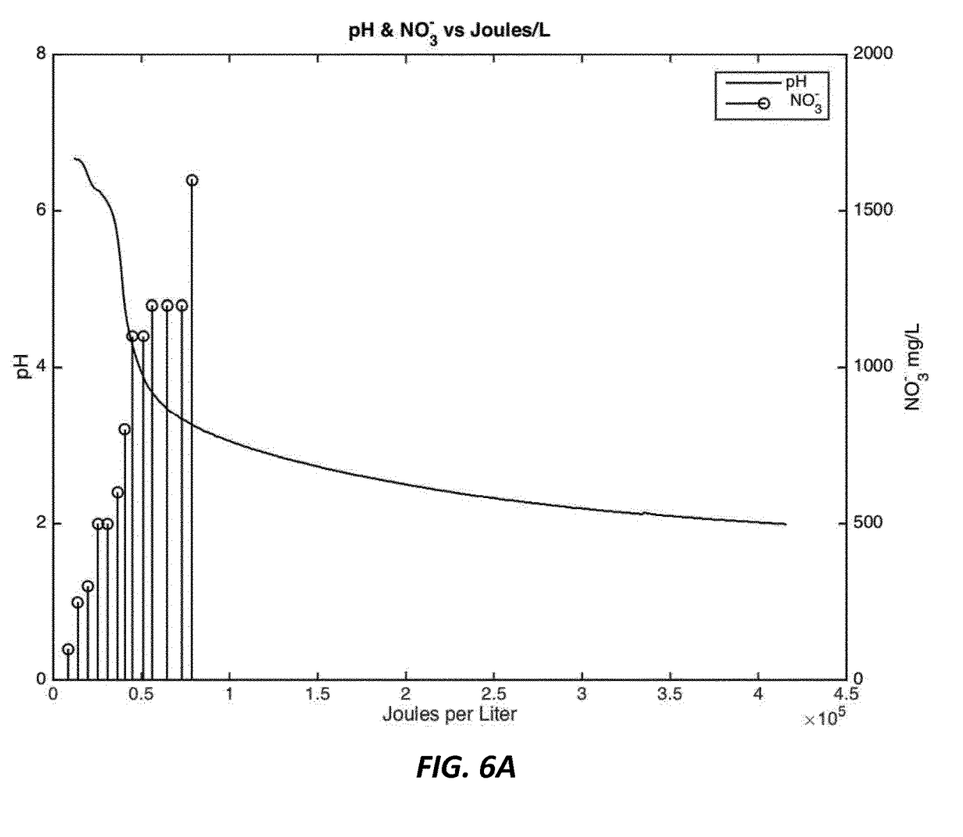
FIGS. 6A-6D show graphs of resultant pH values of $NO_2^-$ and $H_2O_2$ vs plasma energy per volume, according to embodiments of the current invention.
Figure 6B:
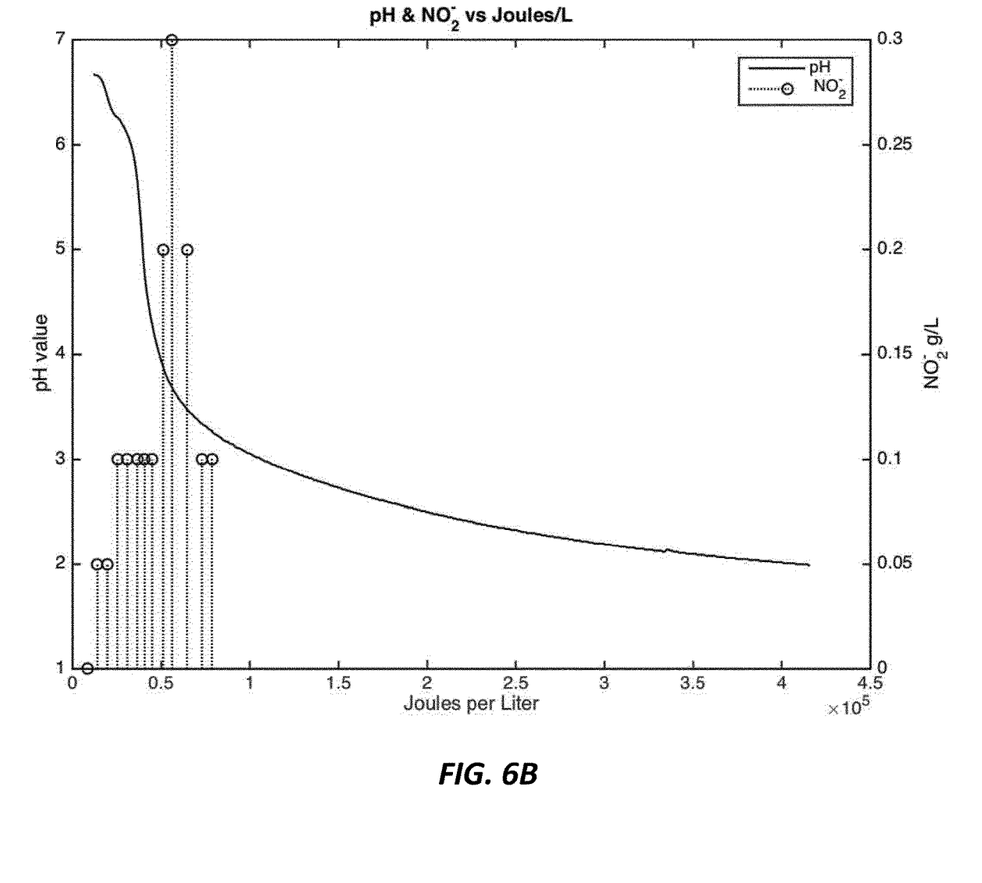
Figure 6C:
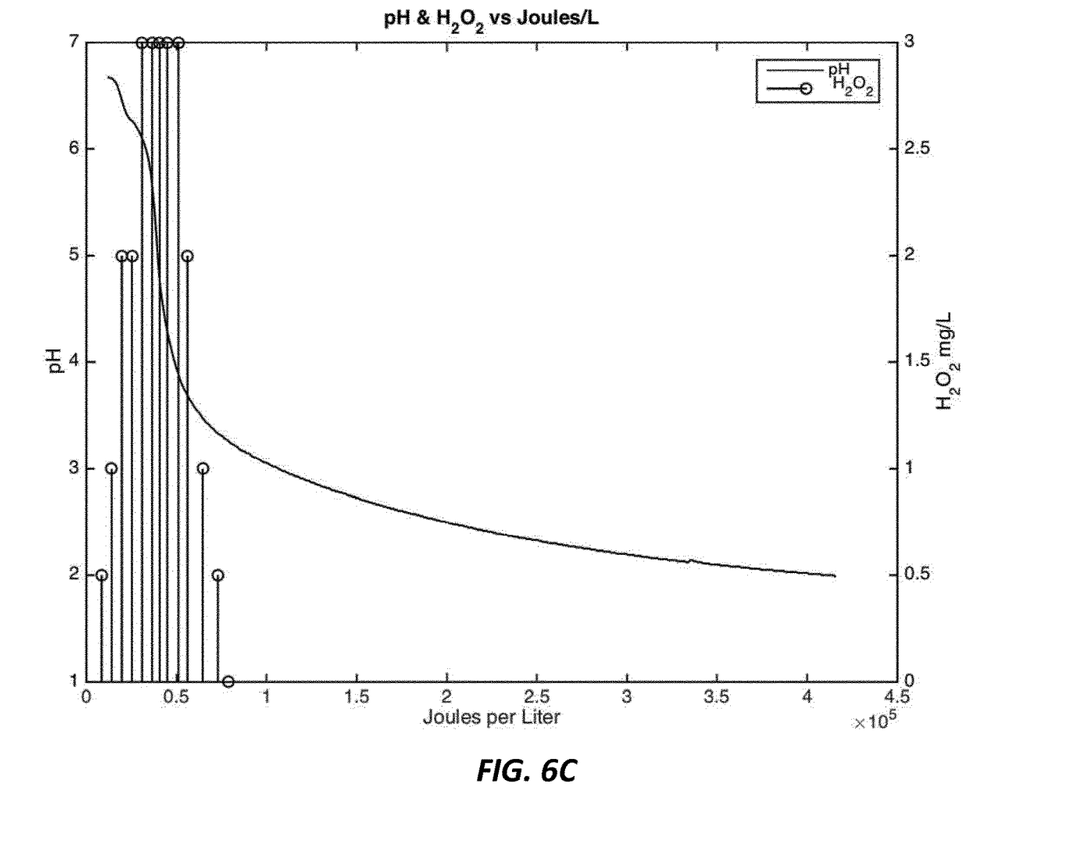
Figure 6D:
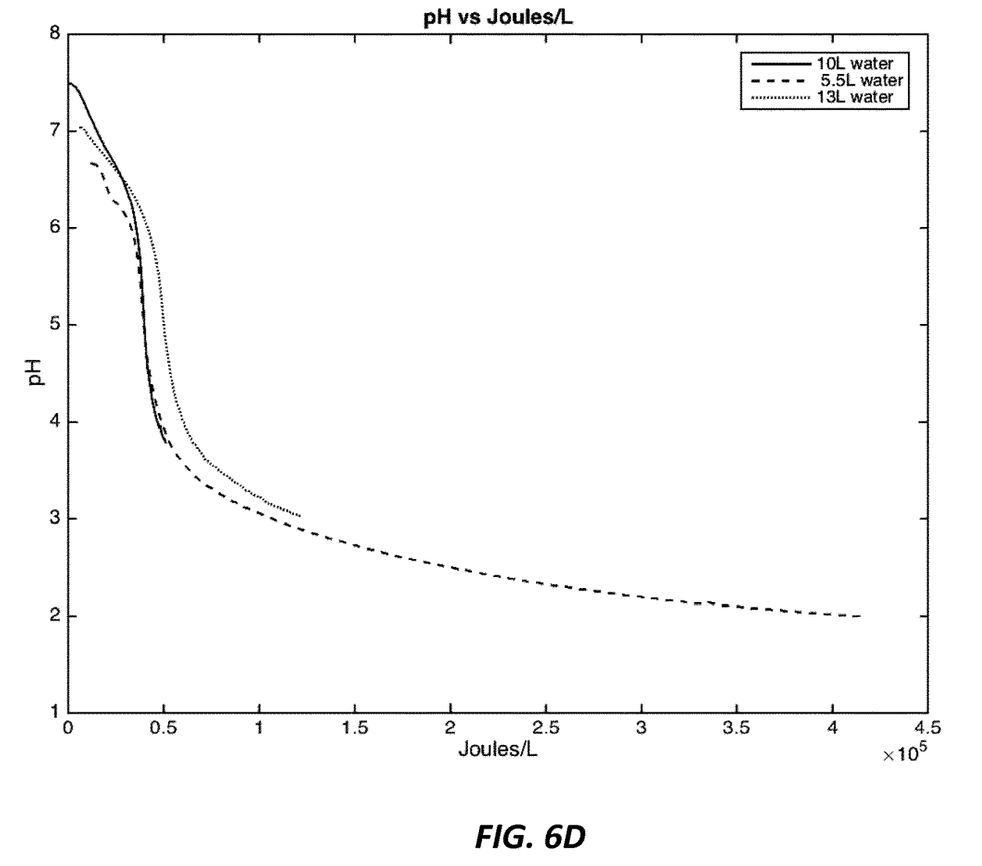

FIG. 3 shows the reaction chamber having a thermal portion separated from a non-thermal portion, where the thermal portion is connected to the non-thermal portion by a reaction chamber conduit, where the thermal portion includes the thermal electrode, where the non-thermal portion includes the non-thermal electrode, according to one embodiment of the invention. FIG. 4 shows an electrode having an insulator, a non-thermal electrode and a thermal electrode, according to one embodiment of the invention.

To ensure that reactive species are very well utilized and dissolved into the water, very good mixing of the water and the reactive gas produced by the plasma is ensured by the features shown in FIG. 1, which include the gas inlet and the water inlet of the reactor are placed off center, while the outlet is positioned rather high or in another case typically low in the center of the reactor. This results in a vortex movement of the air and the water, enhancing the mixing of the reactive species. By using a combined water/gas outlet, the plasma gas runs together with the treated water through the outlet to maximize the contact of ROS and RNS with the water. The air in the reaction is recycled to re-use the gas radicals out of the previous cycle. Thus the reactive gas produced by the plasma is not wasted. The shape of the reactor and the inlet of water and air supply can be positioned in such a way that a vortex is created inside the reaction chamber to further optimize the interface between and the mixing of the plasma and water/liquid to be treated. The shape of the reactor can be conical, but also a venturi shape or cyclone shape.

The method has many parameters that can be adjusted independently and used to optimally control the PAW process towards a certain application, a desired rate/treatment time, or towards the amount of water to be treated. These parameters include adjusting the plasma power and the plasma on/off time (or duty cycle), independently for each of the two plasma modes, adjusting the flow rate of both the air and the water, varying the amount of water in the reservoir, adjusting the air refreshment rate in the recycling loop, varying the absolute pressure in the reactor, and optimizing the water and plasma interface.

An exemplary prototype has been fabricated and successfully tested by laboratory experiments. A first batch of 15 litre of PAW has been produced with this prototype for successful tests on increasing the vase-life of flowers by FloraHolland. By means of a laboratory setup, it has been demonstrated that the method can be used to produce PAW with controlled properties. Tests by EFRO project partners show that the produced PAW successfully reduces infection of plants by botrytis (gerbera/roses), and results in up to 5 log reduction of bacteria that are harmful for human health.

FIGS. 6A-6D show graphs of resultant pH values of $NO_2^-$ and $H_2O_2$ vs plasma energy per volume, according to the current invention.

Other applications of PAW are decalcification for the prevention of limescale, seed germination, and use for feeding water to crops and plants to increase plant growth as natural fertilizer. In one example, when PAW is used within approximately 15 minutes after it is produced a log 8.4 reduction of S. Epidermidis is achieved within 5 minutes and a log 6.5 reduction for S. Aureus is achieved in 10 minutes.

The PAW technology is used to purify and/or disinfect waste water, drinking water or any other water that needs to be purified or disinfected. The current invention enables the production of PAW using exclusively air, electricity and water, where there are no other chemicals added.

For medical applications, PAW allows disinfection of human skin, wounds, root channels in teeth, medical instruments, equipment and surfaces. In addition to disinfection, sterilization is enabled due to a synergetic effect when combining PAW with a mild disinfectant. The dissolved ROS and RNS in the PAW do not only result in disinfection, but also play a role in other important biological processes. Application of PAW on human skin will thoroughly clean and disinfect the skin. Hereby, microorganisms will be killed without affecting the skin and healthy tissue. This enables treatment of skin diseases, such as fungal foot infections, psoriasis, fungal nails, etc.

For agricultural applications, protection, disinfection and germination of seeds, plants, flowers, vegetables and crops, and increasing plant growth are enabled by the invention, where the thermal and non-thermal PAW system is configured directly output PAW to a crop, where the activated liquid/water is than sprayed immediately, or after the PAW has been stored, or applied in any other form. This ensures the use of PAW in its most active form. The vase life of cut flowers can be significantly extend by PAW. Also buds of flowers (roses) infected with botrytis can be reduced by about 60%. PAW can be used as an alternative to existing biocides and pesticides in agriculture and horticulture. The dissolved RNS can be used as feedstock for plants and crops.

Other applications can be waste/drink water cleaning, removal of fouling by biofilms of membranes, such as membranes for cleaning of drinking water. Specifically the production of nitrogen components that can be used as fertilizer for crops and plants is a very interesting application, since the energy consumption of the PAW process is much less than the currently used Haber-Bosch process. The PAW production process can be specifically used to produce hydrogen peroxide which is used for disinfection and as a raw material in chemical production processes.

Important aspects of the invention are provided herein. In one aspect, the reactor generates a thermal plasma and/or a non-thermal plasma to activate water or a liquid forming plasma activated water (PAW) or plasma activated liquid. Both plasmas can run independent from each other or simultaneously. In another aspect, the production of reactive species, ROS and RNS and other plasma components, can be controlled by combining thermal and non-thermal plasmas, thereby controlling the composition of PAW or activated liquid. According to a further aspect, the plasma activated gas is mixed with the liquid in such a way that the reactive species, ROS and RNS can penetrate and dissolved into the liquid, a vortex is preferable used but gas bubbles in the liquid or making a spray of the liquid to mix with the plasma is also provided. Furthermore the pressure can be reduced or increased to enhance the activation process.

In one embodiment, the reactor includes 1 or more electrodes on which the plasmas will be ignited and maintained during the activation process. This can be a thermal plasma and a non-thermal plasma that run independent from each other or simultaneously.

According to a further aspect, the reactor includes a separate water and separate air inlet, where both flows can be adjusted to a specific activation process. The water and air inlets are situated in the reactor so that they create a vortex to optimize the interface between the plasma and the liquid. The outlet of the reactor can also be independently adjusted. The combination of non-thermal and thermal plasma can be controlled to create PAW with a pH ranging from 0 to 7, or an ORP value ranging from 200 mV to 800 mV. Note that the quality and composition of the PAW is not limited to these values. This combination also offers the possibility to control the production and production rates of hydrogen peroxide, nitrate, nitrite, and any other ROS and RNS.

According to a further aspect of the invention, the shape of the reactor is configured for optimal contact between the plasma and the liquid being treated, where the reactor is preferably of a conical shape, a venture shaped reactor and/or a cyclone shaped reactor. The pressure in the reactor can be reduced or increased to optimize the interface between the plasma and the treated liquid.

In another aspect, the invention is configured to dilute the PAW to obtain a desired concentration of any PAW component, pH, ORP or EC value. A reservoir in which the liquid or water is stored and pumped through the reactor to produce PAW, the reservoir can be used to store the PAW until it is applied in a desired application.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, during a period of around 15 min after its activation, the PAW has very strong disinfecting properties, such as to realize 6 to 8 log reduction of bacteria as S. Epidermidids and S. Aureus. After this period of about 15 min, the PAW has "mild" disinfecting properties, that can last for a period of at least 1.5 years after its production (when the PAW is properly stored: cooled, dark, and isolated from air). So the PAW formed by the current invention can have two distinct versions: a very powerful disinfectant that must be used within 15 min after its plasma activation, and a more moderate disinfectant that can be stored for at least 1.5 years and keeps its disinfecting properties during this long period when properly stored. All such variations are considered to be within the scope and spirit of the present invention as defined by the following claims and their legal equivalents.

What is claimed:

1. A thermal and non-thermal plasma activated water reactor system, comprising:
   a. a reaction chamber, wherein said reaction chamber comprises a gas inlet, a water inlet, a gas and water outlet, a ground electrode and reaction electrodes, wherein said water inlet and said gas and water outlet are disposed to form a water vortex in said reaction chamber when water flows there through, wherein said reaction electrodes comprise a thermal plasma electrode for creating a thermal plasma and a non-thermal plasma electrode for creating a non-thermal plasma; and
   b. a water reservoir, wherein said water reservoir is disposed to receive plasma activated water from said reaction chamber and disposed to return said received plasma activated water to said reaction chamber,
   wherein said reaction chamber comprises a thermal portion separated from a non-thermal portion, wherein said thermal portion is connected to said non-thermal portion by a reaction chamber conduit, wherein said thermal portion comprises said thermal electrode, and wherein said non-thermal portion comprises said non-thermal electrode.

2. The thermal and non-thermal plasma activated water reactor system according to claim 1, wherein said water reservoir comprises a water conduit connecting said water reservoir to said reaction chamber water inlet, wherein said water conduit comprises a water pump disposed to move water from said water reservoir to said reaction chamber.

3. The thermal and non-thermal plasma activated water reactor system according to claim 1, wherein said water reservoir comprises a gas conduit connecting a head space of said water reservoir to said reaction chamber gas inlet, wherein said gas conduit comprises a gas pump disposed to move gas from said water reservoir to said reaction chamber.

4. The thermal and non-thermal plasma activated water reactor system according to claim 3, wherein said gas conduit further comprises a fresh air port, wherein said fresh air port is disposed to input fresh air to said gas conduit, wherein said fresh air is input to said reaction chamber gas inlet.

5. The thermal and non-thermal plasma activated water reactor system according to claim 1, wherein said reaction chamber comprises a plasma activated water conduit connecting said reaction chamber to said water reservoir, wherein said plasma activated water conduit comprises a cooling element disposed to cool said plasma activated water moving from said reaction chamber to said water reservoir.

6. The thermal and non-thermal plasma activated water reactor system according to claim 5, wherein said plasma activated water conduit comprises a plasma activated water pump disposed to move said plasma activated water from said reaction chamber to said water reservoir.

7. The thermal and non-thermal plasma activated water reactor system according to claim 6, wherein said plasma activated water conduit comprises a mixer selected from the group consisting of a static mixer, a venture mixer, and a cyclone mixer.

8. The thermal and non-thermal plasma activated water reactor system according to claim 1, wherein said reaction chamber comprises a plasma activated water conduit connecting said reaction chamber to said water reservoir, and wherein said plasma activated water conduit comprises a cooling element disposed to cool said plasma activated water moving from said reaction chamber to said water reservoir and/or a static mixer.

9. The thermal and non-thermal plasma activated water reactor system according to claim 1, wherein said non-thermal electrode and said thermal electrode are turned on and turned off independently, in opposition or in tandem.

10. The thermal and non-thermal plasma activated water reactor system according to claim 1, wherein said thermal plasma electrode is connected to a pulsed AC voltage source, a positive DC voltage source or a negative DC voltage source.

11. The thermal and non-thermal plasma activated water reactor system according to claim 1, wherein said non-thermal electrode is connected to a pulsed RF voltage source, an AC-RF voltage source, or a DC voltage source, wherein said DC voltage source comprises an ohmic series impedance element.

12. The thermal and non-thermal plasma activated water reactor system according to claim 1, wherein said non-thermal electrode is coupled to said gas inlet, wherein said gas inlet is coupled to said water inlet of said reaction chamber, wherein water in said water inlet is plasma activated by said non-thermal electrode as gas is drawn into said water inlet according to venturi forces of said water inlet.

13. The thermal and non-thermal plasma activated water reactor system according to claim 1, wherein said thermal and non-thermal electrodes produce reactive oxygen species and reactive nitrogen species in said plasma activated water.

14. The thermal and non-thermal plasma activated water reactor system according to claim 1, wherein said thermal and non-thermal plasma activated water reactor system is configured to produce a compound selected from the group consisting of a fertilizer nitrogen species, and a hydrogen peroxide species.

15. The thermal and non-thermal plasma activated water reactor system according to claim 1, wherein said non-thermal plasma electrode comprises a plurality of non-thermal electrodes, wherein energy is evenly divided over all said plurality of non-thermal electrodes.

16. The thermal and non-thermal plasma activated water reactor system according to claim 1, wherein said ground electrode comprises metallic container and said reaction chamber comprises a glass or a dielectric chamber, wherein plasma current is conducted by a wall of said glass or said dielectric reaction chamber, wherein said plasma current comprises a displacement current, or a capacitive current.

17. The thermal and non-thermal plasma activated water reactor system according to claim 16, wherein said metallic container comprises a metallic foil.

* * * * *